United States Patent
Freitas et al.

(10) Patent No.: US 9,266,472 B2
(45) Date of Patent: Feb. 23, 2016

(54) SYSTEMS AND METHODS TO INDICATE CLEARANCE FOR VEHICLE DOOR

(71) Applicant: GM GLOBAL TECHNOLOGY OPERATIONS LLC, Detroit, MI (US)

(72) Inventors: Renato De Almeida Freitas, Sao Caetano do Sul (BR); Flavio R. H. Miguel, Santo Andre (BR); Gerald J. Schmidt, Frankfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 14/185,600

(22) Filed: Feb. 20, 2014

(65) Prior Publication Data

US 2015/0232027 A1 Aug. 20, 2015

(51) Int. Cl.
*B60Q 1/00* (2006.01)
*B60Q 9/00* (2006.01)

(52) U.S. Cl.
CPC ..................................... *B60Q 9/008* (2013.01)

(58) Field of Classification Search
CPC ................ B60R 1/00; B60R 2300/101; B60R 2300/8066; G08G 1/16
USPC ........... 340/435, 436, 438, 686.1, 686.2, 903, 340/904, 932.2
See application file for complete search history.

(56) References Cited

U.S. PATENT DOCUMENTS

| | | | |
|---|---|---|---|
| 4,528,563 A | 7/1985 | Takeuchi | |
| 6,150,932 A | 11/2000 | Kenue | |
| 6,876,298 B2 | 4/2005 | Litkouhi et al. | |
| 7,068,155 B2 | 6/2006 | Kade et al. | |
| 7,106,183 B2 | 9/2006 | Hong | |
| 2005/0242618 A1* | 11/2005 | Menard | 296/146.4 |
| 2008/0218381 A1* | 9/2008 | Buckley et al. | 340/932.2 |
| 2009/0032325 A1* | 2/2009 | Frieb-Preis et al. | 180/286 |
| 2009/0073263 A1* | 3/2009 | Harada et al. | 348/148 |
| 2009/0079828 A1* | 3/2009 | Lee et al. | 348/148 |
| 2011/0196568 A1* | 8/2011 | Nickolaou et al. | 701/29 |
| 2013/0113614 A1* | 5/2013 | Yopp | 340/438 |

* cited by examiner

*Primary Examiner* — Tai T Nguyen
(74) *Attorney, Agent, or Firm* — Cantor Colburn LLP

(57) ABSTRACT

In one exemplary embodiment of the invention, a vehicle warning system is provided. The system includes a vehicle having a door movable between a closed position and a fully open position, and an outer zone associated with the door. The outer zone defines an area providing a sufficient clearance to move the door to the fully open position. The system further includes an active safety system that monitors the outer zone and generates a warning signal if an object is located within the outer zone such that the door does not have sufficient clearance to move to the fully open position.

13 Claims, 3 Drawing Sheets

SYSTEMS AND METHODS TO INDICATE CLEARANCE FOR VEHICLE DOOR

FIELD OF THE INVENTION

The subject invention relates to safety systems for vehicles, and more particularly to obstruction sensing systems which can alert a driver to obstructions that prevent opening of a vehicle door.

BACKGROUND

Some known vehicles may include one or more active safety systems that warn a driver of danger that may require immediate attention. For example, the systems may include a forward collision warning system that warns a driver of a potential collision with a moving object such as a vehicle or a pedestrian, or with a non-moving object such as a building. Other active safety systems may include adaptive cruise control, park assist, rear and side object detection, and/or lane departure warning systems.

Some known active safety systems include one or more sensors such as radar, acoustic, and/or optical sensors. For example, park assist, collision warning, and side object detection systems typically include one or more radar sensors that are pointed in forward, rearward, and/or side directions. The radar sensors generate output signals that are used to measure a distance and velocity between the vehicle and other moving and/or non-moving objects. The systems may also compute the relative speeds of the vehicle and the objects and/or angles between the vehicle and the objects.

The active warning systems may trigger audio, visual, and/or haptic alarms to alert the driver if needed. Haptic alarms provide physical feedback such as seat vibration. Usually, the audio alarm is generated using the speakers that are associated with a radio system in the vehicle to reduce cost, although other audio output devices may be used. Additionally, dedicated visual indicators and/or visual indicators that are associated with an instrument panel of the vehicle may also be used.

Although park assist may assist a driver, for example, to safely back into a parking space, the vehicle may be parked too close to an object for full vehicle function. For example, the vehicle may be located too close to a wall, which may interfere with a safe vehicle liftgate opening operation.

Accordingly, it is desirable to provide a detection system to determine if a vehicle component has sufficient clearance to operate properly.

SUMMARY OF THE INVENTION

In one exemplary embodiment of the invention, a vehicle warning system is provided. The system includes a vehicle having a door movable between a closed position and a fully open position, and an outer zone associated with the door. The outer zone defines an area providing a sufficient clearance to move the door to the fully open position. The system further includes an active safety system that monitors the outer zone and generates a warning signal if an object is located within the outer zone such that the door does not have sufficient clearance to move to the fully open position.

In another exemplary embodiment of the invention, a vehicle warning system is provided. The system includes a vehicle having a trunk access door movable between a closed position and a fully open position, and a park assist system that monitors an area within a full park assist range zone. The full park assist range zone includes a tailgate access zone that defines a space providing a sufficient clearance to move the trunk access door to the fully open position. The park assist system generates a first warning signal when an object is detected within the full park assist range zone but outside the tailgate access zone, and a second warning signal when the object is detected within the tailgate access zone. The second warning signal is different from the first warning signal In yet another exemplary embodiment of the invention, a method of operating a vehicle warning system for a vehicle having a door movable between a closed position and a fully open position, and an outer zone associated with the door, where the outer zone defines an area providing sufficient clearance to move the door to the fully open position, is provided. The method includes monitoring the outer zone with an active safety system and generating a warning signal if an object is located within the outer zone such that the door does not have a sufficient clearance to move to the fully open position.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
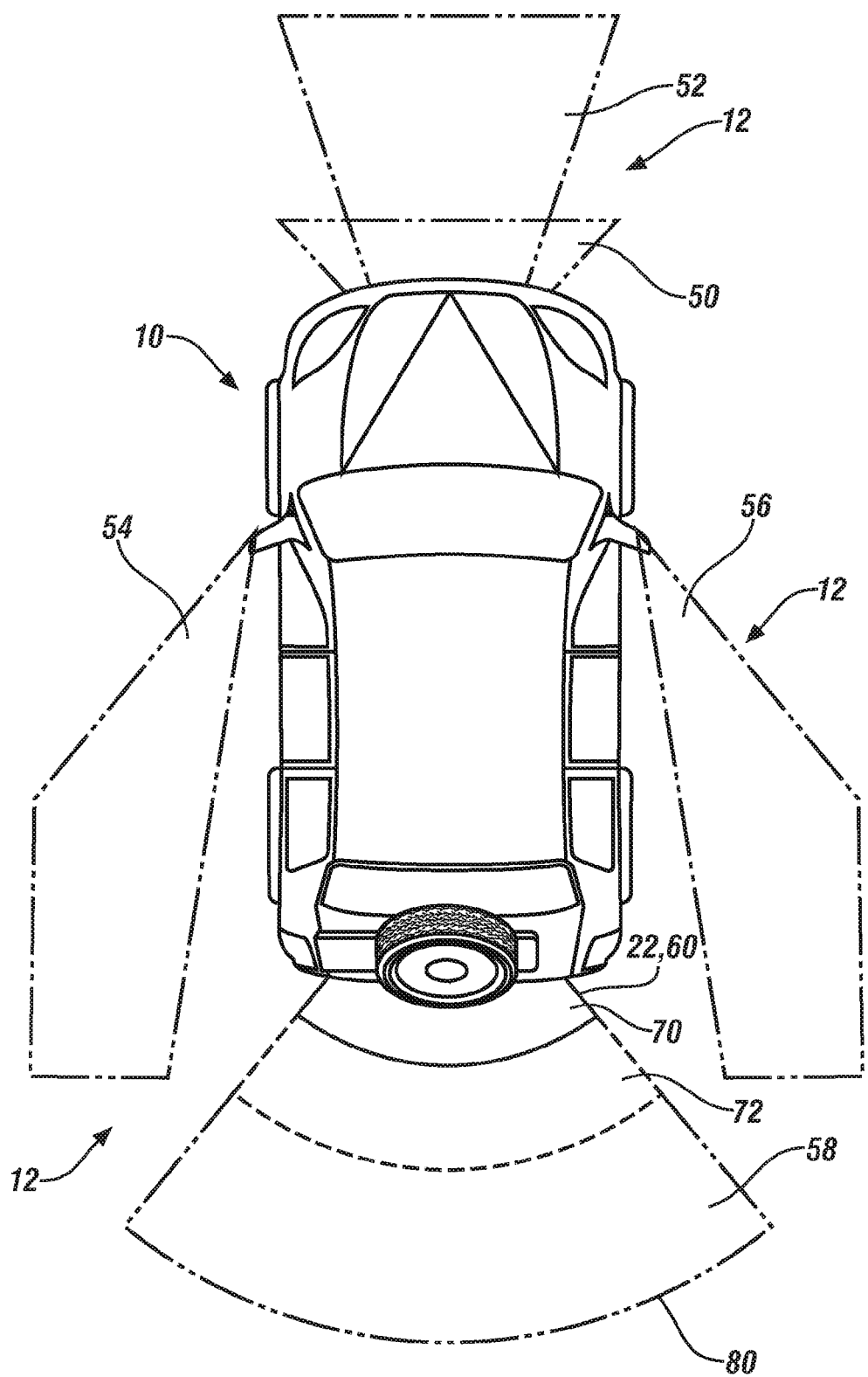
FIG. 1 is a schematic illustration of a vehicle, exemplary active safety zones around the vehicle, and exemplary active safety systems that monitor the active safety zones.

The following description is merely exemplary in nature and is not intended to limit the present disclosure, its application or uses. It should be understood that throughout the drawings, corresponding reference numerals indicate like or corresponding parts and features.

Figure 2:
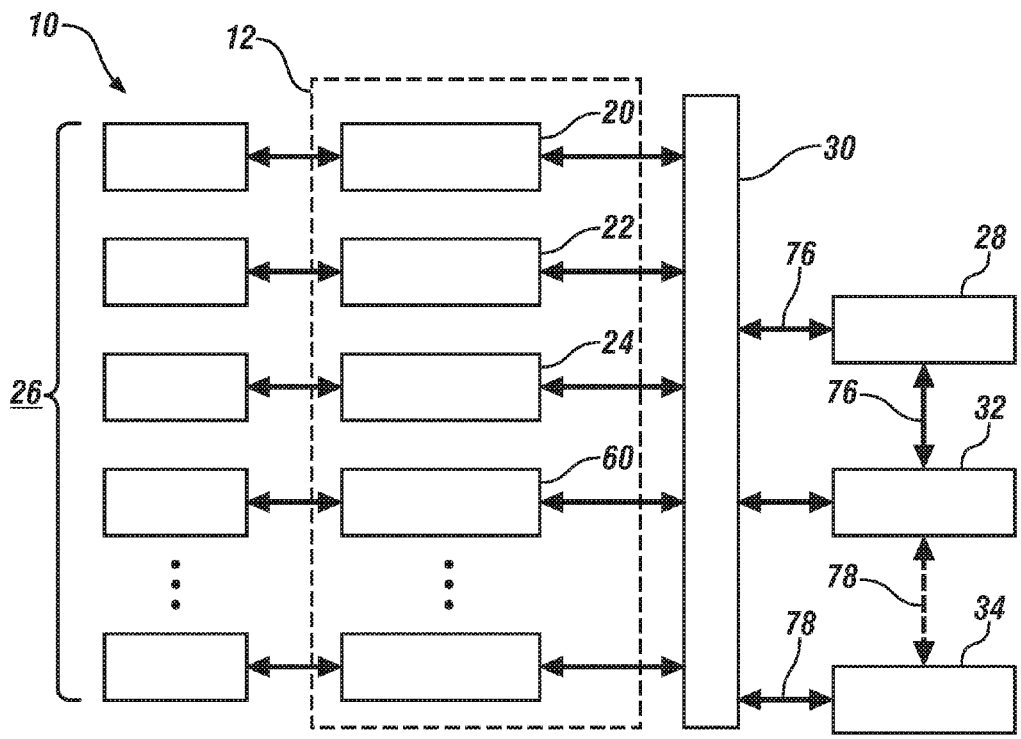
FIG. 2 is a functional block diagram of the active safety systems of the vehicle shown in FIG. 1.

In accordance with an exemplary embodiment of the invention, FIGS. 1 and 2 illustrate a vehicle 10 having active safety systems 12, which may include a forward collision warning system 20, a park assist system 22, and a side object detection system 24. As can be appreciated, any other active safety systems 12 in addition to and/or instead of these exemplary active safety systems maybe used without departing from the present invention. For example, other active safety systems may include near field object detection such as a surround view camera system with image processing or 360° ultrasonic park sensors. Each active safety system can be implemented using dedicated and/or shared controllers with one or more software modules, one or more application specific integrated circuits (ASIC), dedicated discrete circuits, or in any other suitable manner.

Active safety systems 12 may include one or more sensors 26 that sense one or more parameter variables. For example, sensors 26 may include radar sensors, radio frequency sensors, optical sensors, acoustic sensors, infrared sensors, or any other type of sensors. Sensors 26 may be shared between two or more active safety systems and/or dedicated sensors, and active safety systems 12 process the sensed parameters. Additionally, other input signals may be provided by other vehicle systems to one or more of active safety systems 12. For example, vehicle speed may be input from a vehicle speedometer. Still other signals may be provided such as steering wheel position, engine parameters, wheel slip, traction control signals, transmission control signals, global position and/or map-based signals, accelerator pedal position signals, and/or any other signals. In addition, information from the environment (such as other vehicles) can be remotely communicated to the vehicle.

Figure 3:
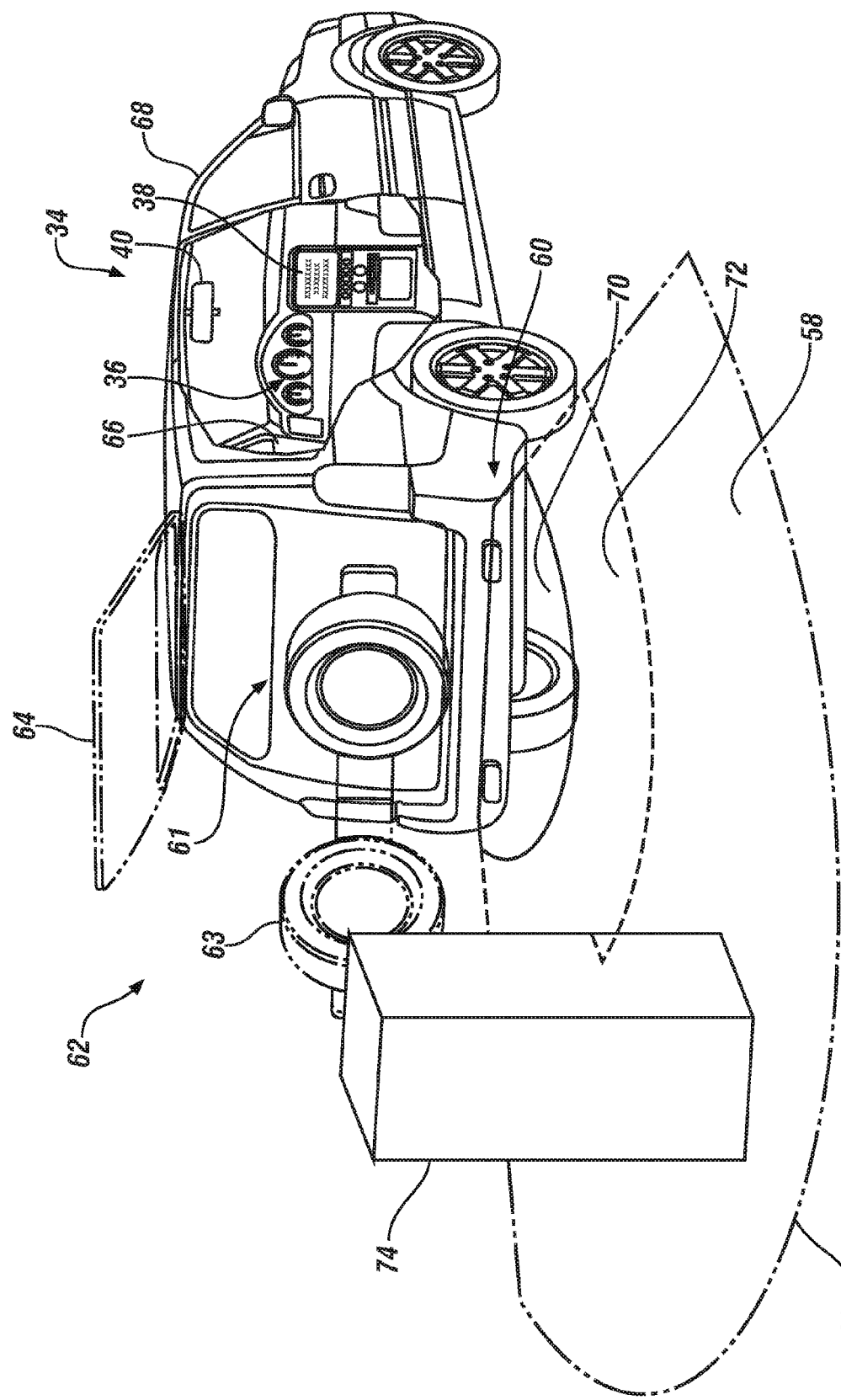
FIG. 3 is a perspective view of an exemplary vehicle having a vehicle compartment access warning system to monitor active safety zones.

Active safety systems 12 include one or more algorithms that receive the input signals, that assess potential hazards in zones outside of the vehicle, and that generate warning signals such as audio, visual, and/or haptic alarm signals to alert drivers of the potential hazards. The alarm signals may be output directly to dedicated and/or shared audio, visual, and/or haptic indicators that are associated with one or more active safety system. For example, alarm signals can be output to front and rear speakers of a vehicle audio system 28 either directly, via a data bus 30, or via data bus 30 and/or one or more vehicle controllers 32. Moreover, additional dedicated speakers that are not associated with audio system 28 may be employed. Alarm signals may also be output to an in-vehicle display 34 either directly, via data bus 30, or via data bus 30 and/or the one or more vehicle controllers 32. As shown in FIG. 3, display 34 may be, for example, a vehicle instrument cluster 36, a dashboard display 38 (e.g., LCD touchscreen), a rear-view mirror 40, and/or any suitable visual display.

Active safety systems 12 operate in multiple defined zones outside of vehicle 10. For example, park assist system 22 operates in a first front zone 50 that is located close to the front of vehicle 10. Forward collision warning system 20 operates in a second zone 52 that is located in front of the vehicle and includes all or part of first zone 50. Left and right side object detection system 24 operate in left and right side zones 54 and 56, respectively. Park assist system 22 also operates in a third zone 58 at the rear of the vehicle.

With further reference to FIG. 3, active safety systems 12 also include a vehicle compartment access warning system 60 or driver information system to monitor outside zones of the vehicle and to alert drivers whether a vehicle door has enough clearance to transition from a closed position to a fully open position such that a person can access a vehicle compartment (e.g., a trunk 61). For example, vehicle compartment access warning system 60 is operatively associated with a vehicle rear-gate 62 (e.g., a tailgate 63, a vehicle liftgate 64, a rear window, etc.) to monitor and alert a driver if an obstruction will prevent full access to trunk 61. Additionally, vehicle compartment access warning system 60 may be operatively associated with any suitable vehicle door such as a driver's door 66 or passenger door 68. Vehicle compartment access warning system 60 may be an independent active safety system 12 or may be included with an existing system such as the forward collision warning system 20 (e.g., to monitor hood clearance) or side object detection system 24 (e.g., to monitor door 66, 68 clearance).

In the exemplary embodiment, park assist system 22 includes vehicle compartment access warning system 60, which operates in a fourth or full warning zone 70 at the rear of the vehicle, in a fifth or rear-gate access zone 72 that is at the rear of vehicle 10 outside of fourth zone 70, and in the third or full park assist range zone 58 that is located at the rear of the vehicle and includes all or part of fourth zone 70 and fifth zone 72.

Figure 5:
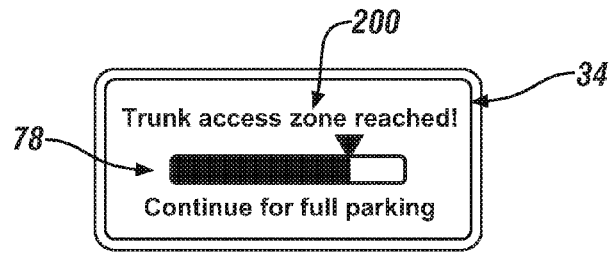
FIG. 5 is an illustration of an exemplary visual warning signal output of the active safety systems.

In some situations, for example during parking, vehicle 10 may be moved such that an object 74 is present within full park assist range zone 58, rear-gate access zone 72, and/or full warning zone 70. When object 74 is present within zone 58 outside of rear-gate access zone 72, a first warning signal 100 is generated to alert the driver of object 74. First warning signal 100 may be an audio signal output 76 (FIG. 2) through audio system 28, a visual signal output 78 (FIG. 2) through display 34, and/or a haptic signal output (not shown) through a suitable medium (e.g., driver's seat). Audio signal output 76 may be any suitable tone, frequency, or period (e.g., steady beeping sound), and visual signal output 78 may be any suitable visual indicator such as, for example, written text, pictures, and/or symbols (see FIG. 5).

Figure 4:
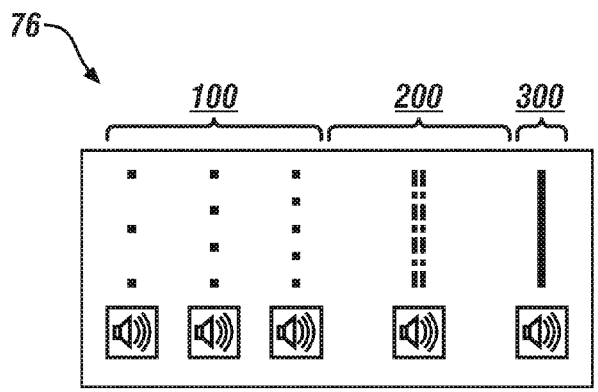
FIG. 4. is an illustration of exemplary audio warning signal outputs of the active safety systems.

Moreover, audio signal output 76 may increase in frequency as object 74 moves from a third zone outer edge 80 closer to zone 72, to thereby facilitate indicating to the driver that object 74 is getting closer to the vehicle (see FIG. 4). When object 74 is present in third zone 58 and outside of fifth zone 72, rear-gate 62 has sufficient space to move from a closed position to a fully open position such that a person can fully access trunk 61.

As object 74 breaches rear-gate access zone 72, object 74 will now be in a location such that rear-gate 62 does not have sufficient clearance to move to the fully open position, thereby hindering access to trunk 61. As such, in the exemplary embodiment, a second warning signal 200 is generated to alert the driver that access to trunk 61 is prevented or limited. In the exemplary embodiment, second warning signal 200 is different from first warning signal 100. For example, the tone, frequency, and/or period of audio signal output 76 may be different than the tone, frequency, and/or period of first warning signal 100, and the text, picture, and/or symbol of visual signal output 78 may be different than the text, picture, and/or symbol of first warning signal 100.

As object 74 breaches full warning zone 70, the object will now be in a location such that there is an immediately impending collision between object 74 and vehicle 10, as well as little or no clearance for rear-gate 62 to open to provide access to trunk 61. As such, in the exemplary embodiment, a third warning signal 300 is generated to alert the driver of the impending collision and/or that access to trunk 61 is prevented or limited. In the exemplary embodiment, third warning signal 300 is different from first and second warning signals 100, 200, respectively. For example, the tone, frequency, and/or period of audio signal output 76 may be different than the tone, frequency, and/or period of first and second warning signals 100, 200 (e.g., output 76 may be a steady tone), and the text, picture, and/or symbol of visual signal output 78 may be different than the text, picture, and/or symbol of first and second warning signals 100, 200. Additionally, vehicle 10 may include a camera (not shown) that displays a view of the area behind the vehicle on display 34. A depiction of zones 58, 72, and 70 may be displayed on the camera view and may be indicated by respective colors such as green, yellow, and red.

A method of operating a vehicle warning system includes monitoring outer, rear-gate access zone 72 with an active safety system 12 such as vehicle compartment access warning system 60. A warning signal is generated if object 74 is located within zone 72 such that door 62 does not have a sufficient clearance to move to the fully open position. The warning signal may be audio signal output 76, visual signal output 78, and/or a haptic signal output.

Described herein are systems and methods for alerting a driver as to whether or not a vehicle door has sufficient clearance to move from the closed to the fully open position to thereby provide access to a vehicle compartment such as the trunk. A monitoring and warning system monitors a defined zone outside of the vehicle corresponding to an area that provides sufficient clearance for the door to move to the fully open position. When the vehicle is moved such that an object is close to or within the defined zone, the system generates a warning signal in the form of an audio, visual, and/or haptic signal output that alerts the driver that access to the vehicle compartment may be compromised. Accordingly, the systems and methods described herein assist a driver to position the vehicle for full access to the desired vehicle compartment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle warning system comprising:
    a vehicle having a trunk access door movable between a closed position and a fully open position; and
    a park assist system that monitors an area within a full park assist range zone, the full park assist range zone including a tailgate access zone that defines a space providing a sufficient clearance to move the trunk access door to the fully open position, wherein the park assist system generates a first warning signal when an object is detected within the full park assist range zone but outside the tailgate access zone, and a second warning signal when the object is detected within the tailgate access zone, and wherein the second warning signal is different from the first warning signal.

2. The system of claim 1, wherein the full park assist range zone further includes a full warning zone separate from the tailgate access zone, wherein the park assist system generates a third warning signal when the object is detected within the full warning zone, and wherein the third signal is different from the first and second warning signals.

3. The system of claim 2, wherein the first warning signal is a first audio signal, the second warning signal is a second audio signal, and the third warning signal is a third audio signal, wherein the first, second, and third audio signals are different from each other.

4. The system of claim 3, wherein the first, second, and third audio signals are different from each other in at least one of tone, frequency, and period.

5. The system of claim 2, wherein the first warning signal is a first visual signal displayed on a display of the vehicle, the second warning signal is a second visual signal displayed on the display of the vehicle, the third warning signal is a third visual signal displayed on the display of the vehicle, and wherein the first, second, and third visual signals are different from each other.

6. The system of claim 5, further comprising a camera configured to display a camera view of the area behind the vehicle on the vehicle display, wherein the full warning zone, the tailgate access zone, and the full park assist range zone are displayed on the camera view on the vehicle display.

7. The system of claim 6, wherein the full warning zone is displayed in red, the tailgate access zone is displayed in yellow, and the full park assist range zone is displayed in green.

8. The system of claim 1, wherein the first warning signal is a first audio signal and the second warning signal is a second audio signal, and wherein the second audio signal is different from the first audio signal.

9. The system of claim 1, wherein the first warning signal is a first visual signal displayed on a display of the vehicle and the second warning signal is a second visual signal displayed on the display of the vehicle, and wherein the first visual signal is different from the second visual signal.

10. The system of claim 9, wherein the vehicle display is at least one of an instrument panel cluster, a dashboard display monitor, and a rear-view mirror.

11. The system of claim 2, wherein the park assist system comprises a rear collision warning system.

12. A method of operating a vehicle warning system for a vehicle having a trunk movable between a closed position and a fully open position, and a tailgate zone associated with the trunk, where the tailgate zone includes a tailgate access zone defining an area providing sufficient clearance to move the trunk to the fully open position, the method comprising:
    monitoring the tailgate zone with an active safety system; and
    generating a first alarm signal when an object is sensed within the tailgate zone and a second alarm signal, distinct from the first alarm signal, when the object is detected within the tailgate access zone.

13. The method of claim 12, further comprising at least one of:
    outputting the warning signal as an audio signal from at least one speaker of the vehicle; and
    outputting the warning signal as a visual signal on a display of the vehicle.

* * * * *